United States Patent [19]

Tanji et al.

[11] Patent Number: 4,472,345
[45] Date of Patent: Sep. 18, 1984

[54] LOAD CONTROL SYSTEM FOR NUCLEAR POWER PLANT

[75] Inventors: Junichi Tanji; Masayuki Izumi, both of Hitachi, Japan

[73] Assignee: Hitachi, Ltd., Tokyo, Japan

[21] Appl. No.: 286,513

[22] Filed: Jul. 24, 1981

[30] Foreign Application Priority Data

Jul. 25, 1980 [JP] Japan ............... 55-101286

[51] Int. Cl.³ .............................................. G21C 7/00
[52] U.S. Cl. .................... 376/211; 376/216; 376/241
[58] Field of Search ................ 376/216, 211, 241

[56] References Cited

U.S. PATENT DOCUMENTS

| 2,968,600 | 1/1961 | Allen | 376/241 |
|---|---|---|---|
| 3,102,394 | 9/1963 | Hartfield et al. | 376/216 |
| 3,167,480 | 1/1965 | West et al. | 376/211 |
| 3,284,312 | 11/1966 | West | 376/216 |
| 3,931,503 | 1/1976 | Berbile et al. | 376/241 |
| 4,104,117 | 8/1978 | Parziale | 376/211 |
| 4,150,546 | 4/1979 | Collett | 376/211 |

FOREIGN PATENT DOCUMENTS

| 1041776 | 7/1978 | Canada | 376/241 |
|---|---|---|---|
| 2206234 | 8/1973 | Fed. Rep. of Germany | 376/216 |
| 1356683 | 2/1964 | France | 376/216 |
| 52-63591 | 5/1977 | Japan | 376/216 |
| 54-140696 | 11/1979 | Japan | 376/241 |
| 439227 | 3/1975 | U.S.S.R. | 376/216 |

Primary Examiner—Sal Cangialosi
Attorney, Agent, or Firm—Antonelli, Terry & Wands

[57] ABSTRACT

A load control system for a boiling water reactor power plant. A recirculating pump speed demand signal and a total steam flow demand signal are derived on the basis of combination of a first control signal produced in accordance with a power difference signal representative of difference between an actual value of an output power of an electric generator and a set value for the generator output and a second control signal produced in accordance with a pressure difference signal representative of difference between an actually measured value of the reactor pressure and a set value therefor. Speed of a recirculating pump is controlled in dependence on the recirculating pump speed demand signal, while opening degrees of a governor valve and a bypass valve of a turbine are controlled in accordance with the total steam flow demand signal. The recirculating pump speed demand signal and the total steam flow demand signal are derived by combining the first or the second control signal which has been regulated through gain elements. Further, the power difference signal is added to the pressure difference signal for modifying the set point for the reactor pressure.

14 Claims, 10 Drawing Figures

LOAD CONTROL SYSTEM FOR NUCLEAR POWER PLANT

BACKGROUND OF THE INVENTION

The present invention relates to a load control system for a nuclear power plant of a boiling water reactor (BWR) type.

Heretofore, the BWR nuclear power plant has been operated with a constant output power under a rated load. However, as proportion of power supply by the nuclear power plant becomes increased year after year, there arises a great demand for the operation of the nuclear power plant in a load follow-up control mode, as is in the case of the thermal power plant.

In the hitherto known load control system for the BWR power plant, a recirculated flow is regulated in dependence on a deviation or difference between a set load value and an actual load value. Since the power of the nuclear reactor varies in accordance with regulation of the recirculated flow, the power of the reactor, i.e. the steam pressure supplied to a turbine is correspondingly varied. A governor valve provided at an inlet port of the turbine is controlled in the closing or opening direction in response to increasing or decreasing in the steam pressure with reference to a preset fixed level. As the consequence, the increasing or decreasing in the steam pressure results in the actuation of the governor valve in the closing or opening direction to thereby control correspondingly the output power of an electric generator coupled to the turbine. In other words, the power of the reactor is first controlled, which is then followed by the corresponding control of the turbine system.

In the conventional follow-up control described above, a time lag on the order of several seconds is involved until the output power of the electric generator is varied in response to a change in load. Such time lag may be given in terms of a time constant expression of first order lag which approximates a sum of a time required for the recirculated flow to be varied in accordance with the output signal of the control system and a time required for a change in the thermal output of fuel to be transferred to the coolant within the reactor.

Because the time lag in the load follow-up control described above is never insignificant, resultant loss of generated energy can not be neglected in the load following-up operation to meet a light load demand, for example. Further, in view of conservation of resources which is one of the national problems to be solved, it is desirable that the load following-up operation be carried out without involving any significant time lag.

SUMMARY OF THE INVENTION

An object of the present invention is to provide a load control system for a BWR nuclear power plant which is improved in respect of the load follow-up control performance.

In the load control system for BWR power plant provided according to an aspect of the invention, speed of a recirculating pump of a nuclear reactor and opening degrees of a turbine governor valve and a bypass valve are controlled on the basis of the output of the electric generator and pressure level in the reactor. To this end, a recirculating pump speed demand signal for controlling the speed of the recirculating pump and a total steam flow demand signal for controlling the opening degrees of the turbine governor valve and the by- pass valve are derived from a first control signal prepared in accordance with difference between a set output of the electric generator and an actually measured value thereof and a second control signal prepared on the basis of difference between a set value of the reactor pressure and the actually measured value thereof. The recirculating pump speed demand signal and the total steam flow demand signal are made available by means of gain elements for regulating the first and the second control signals, respectively, and combining units for combining the first or the second control signal with an output value from the associated gain elements.

DESCRIPTION OF THE PREFERRED EMBODIMENTS

In the first place, description will be made on a hitherto known load control system for a boiling water reactor (BWR) power plant by referring to FIGS. 1, 2 and 3A and 3B in order to facilitate the understanding of the present invention.

Figure 1:
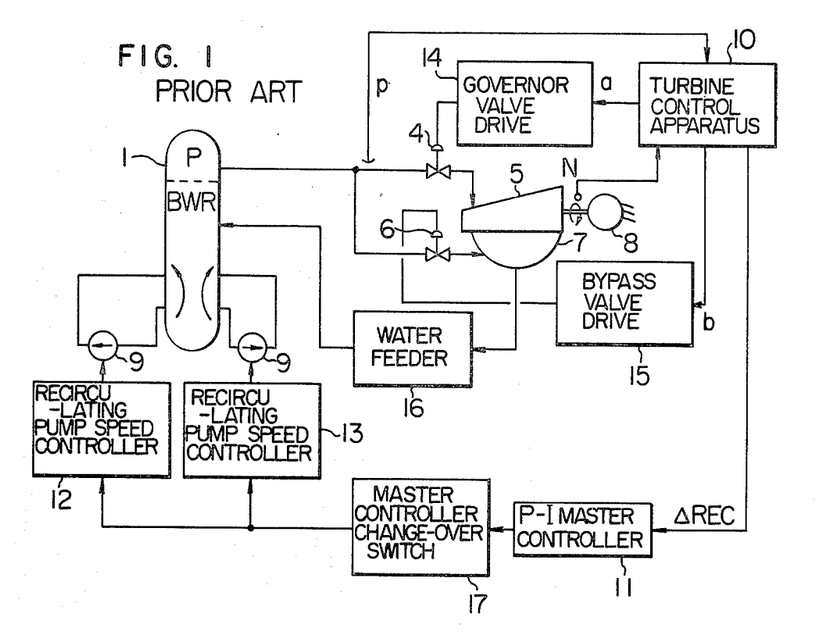
FIG. 1 shows in a block diagram a general arrangement of a hitherto known load control system for a BWR nuclear power plant.

Referring to FIG. 1 which shows a general arrangement of a hitherto known boiling water reactor power plant, vapor or steam generated in a nuclear reactor 1 is introduced to a turbine 5 by way of a turbine governor valve 4 and thereafter supplied to a condenser 7 in which steam is condensated to water to be returned to the nuclear reactor 1 through a water feed system 16. A turbine control apparatus 10 is supplied with a signal representative of a pressure p prevailing at an inlet port of the turbine 5 and a signal representative of a turbine speed N and regulates on the basis of these input signals the turbine governor valve 4 through a governor valve driving mechanism 14 and the opening degree of a bypass valve 6 through a bypass valve driving mechanism 15, to thereby control the pressure within the nuclear reactor 1 as well as the turbine speed and hence the output power of an electric generator 8. Further, a deviation or difference signal ΔREC between a set value of turbine load and an actual load value is produced from the output of the turbine control apparatus 10 and undergoes a proportional plus integral control action in a master controller 11. The output signal from the master controller 11 thus obtained is utilized for varying the speed of a recirculating pump 9 by way of a master controller change-over switch (automatic/-manual) 17 and recirculating pump speed controllers 12 and 13, as the result of which recirculated flow is correspondingly varied to regulate power of the nuclear reactor 1.

Figure 2:
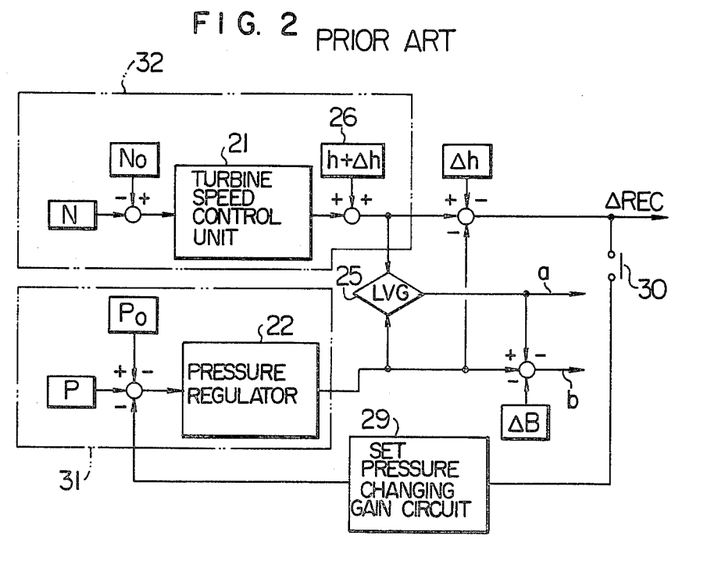
FIG. 2 shows a block diagram of a hitherto known turbine control apparatus employed in the load control system shown in FIG. 1.

FIG. 2 shows in a block diagram of an arrangement of the turbine control apparatus 10 shown in FIG. 1. As can be seen from the figure, the turbine control apparatus 10 is constituted by a reactor pressure controller 31 and a turbine speed controller 32. The reactor pressure controller 31 includes a pressure regulator 22 for performing a lead/lag operation on a deviation or difference signal between the reactor pressure P which is in proportional dependence on the turbine inlet pressure p and a set value $P_O$ of the reactor pressure P. The turbine speed controller 32 includes a turbine speed control unit 21 for arithmetically determining a regulation rate of a deviation or difference signal indicative of a difference between the turbine speed N and a set value $N_O$ thereof and a load setting unit 26 for adding a load setting signal $(h+\Delta h)$ to the output signal from the turbine speed control unit 21.

Since the load setting signal produced from the load setting unit 26 represents a sum of a turbine load h which the turbine 7 is always to assume and a bias quantity $\Delta h$, the magnitude of the output signal from the turbine speed controller 32 is greater than that of the output signal from the reactor pressure controller 31 by the bias quantity $\Delta h$ in the steady state of the plant operation, resulting in that the output signal from the reactor pressure controller 31 is selected by a low value gain (LVG) selector 25, whereby a governor valve opening demand signal a is produced. The bias quantity $\Delta h$ is utilized to put preference on the pressure control of the nuclear reactor over the turbine speed control and usually selected about 10% of turbine load h.

By subtracting a bypass valve opening bias $\Delta B$ from the difference between the output signal of the reactor pressure controller 31 and the governor valve opening demand signal a, a bypass valve opening demand signal b is derived. In the steady operation state, the bypass valve is held in the fully closed state by the bypass valve opening bias quantity $\Delta B$. However, when an abrupt increase occurs in the turbine speed with the result that the magnitude of the output signal from the turbine speed control unit 21 which is substantially equal to zero in the steady state operation is reduced to a smaller value than the bias quantity $\Delta h$, then the output signal from the turbine speed controller 33 is selected as the governor valve opening demand signal a, while the bypass valve opening demand signal b is rendered to be positive to thereby actuate the bypass valve 6.

A deviation or difference signal $\Delta REC$ which constitutes a reactor power change demand signal is derived as a difference in magnitude between the output signal from the turbine speed controller 32 minus the bias signal $\Delta h$ (accordingly, this output signal is equal to the set value h of the turbine load in the steady operation state) and the output signal from the reactor pressure controller 33 which signal is therefore to be referred to as the total steam flow demand signal. When a set pressure modifying circuit switch 30 is turned on, the set point of pressure is modified or changed by the deviation signal $\Delta REC$ by way of a pressure set point modifying gain circuit 29 which usually exhibit a lag or delay characteristic of first order.

Next, operation of the hitherto known load control system for the boiling water reactor power plant described above which occurs in response to the set load point changing demand will be described in conjunction with FIGS. 3A and 3B which illustrate results of simulation carried out with the aid of an electronic computer. In the case where the set pressure point changing circuit is ineffective (i.e. the switch 30 is turned off), variations in the output power from the electric generator and the reactor pressure P are represented by broken line curves in FIGS. 3A and 3B, respectively. In response to the step-like increase or increment of the set load point $N_O$, the magnitude of the output signal from the turbine speed controller 32 is increased in a step-like manner, resulting in a corresponding increasing in the magnitude of the deviation signal $\Delta REC$. In contract, the output signal from the master controller 11 is initially increased in a step-like manner under the proportionating action of the controller 11 and subsequently increased in a ramp-like manner under the integrating action thereof. In response to the output signal from the master controller 11, the speed of the recirculating pump is increased, eventually involving a corresponding increase in the power of the nuclear reactor. The increase in the power of the nuclear reactor in turn results in a corresponding increase in the amount of steam generated with a time lag which corresponds to a time required for heat transfer from fuel to cooling water. As the consequence, the reactor pressure P is correspondingly increased. At this time, the magnitude of the governor valve opening demand signal a is increased under the action of the reactor pressure controller 31, bringing about a corresponding increase in the amount of steam flow to the turbine. In this manner, the output power Q of the electric generator 8 is finally increased. It should however be noted that the output power Q of the electric generator 8 is determined in dependence on the relationship between the opening degree of the turbine governor valve and the steam flow as well as the relationship between the steam flow and the turbine output (or load), since the control is performed with the set load point being utilized as the desired or target value.

Figure 3A:
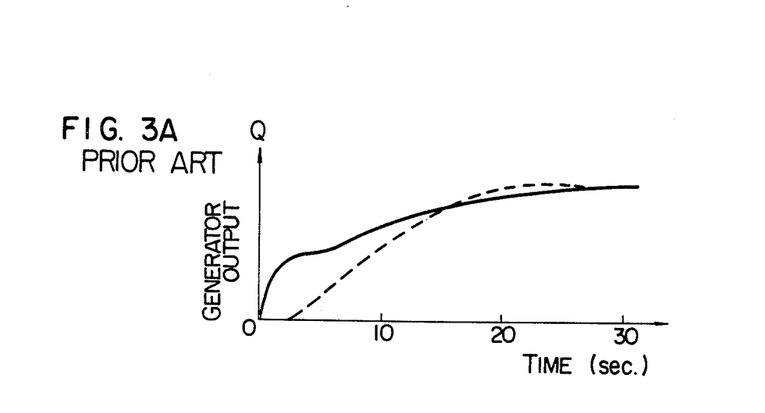
FIGS. 3A and 3B graphically illustrate computer-simulated response characteristics of the load control system shown in FIG. 1 upon changing of a set output power level of an electric generator.
Figure 3B:
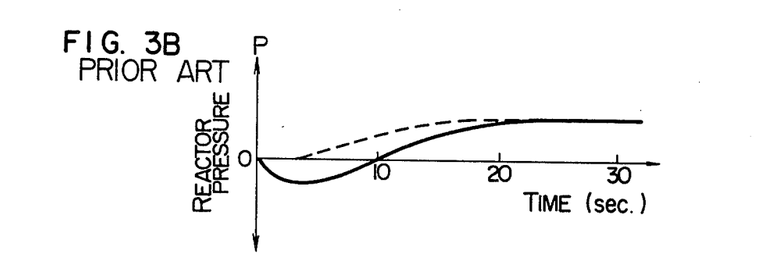

As will be appreciated from the foregoing elucidation, primary lag factors involving a delay or lag in the operation sequence or flow starting from the set load point alternation and leading to variation in the output power of the electric generator includes a delay in the response of the recirculating system and a delay in the heat transfer from fuel, and thus may be considered approximately as the delay or lag of second order with the output Q from the electric generator 8 exhibiting a response of the characteristic represented by a broken line curve in FIG. 3A. Further, since the reactor pressure P is controlled in consideration of the regulation rate, the reactor pressure P is increased in a manner indicated by a broken line curve in FIG. 3B as the quantity of steam flow is increased. In this connection, with the terminology "regulation rate", it is intended to mean the rate of increase in the turbine inlet pressure relative to the primary steam flow (i.e. the opening degree of the turbine governor valve 4).

Variations in the reactor power P and the output power Q of the generator which occur in response to the closing of the set pressure point changing circuit switch 30 are illustrated by solid line curves in FIGS.

3A and 3B, respectively. In this case, because the increase in the magnitude of the deviation signal ΔREC which results from the increase in the set load point $N_O$ is applied to the input of the pressure regulator 22, the output signal from the latter and hence the governor valve opening demand signal a produced from the reactor pressure controller 31 are rapidly increased, which means that the initial response reflected as the increasing in the output Q of the electric generator 8 is certainly enhanced or improved. However, since the power of the nuclear reactor 1 is not yet increased at this time point, the reactor pressure P will soon be decreased as indicated by a solid line curve shown in FIG. 3B. In other words, the output signal from the reactor pressure controller 31 may once be increased rapidly to a certain level and then only progressively increased as the power of the nuclear reactor is increased. As the consequence, the increase in the output power Q of the electric generator encounters a stall level in the initial phase, as can be seen from the solid line curve shown in FIG. 3A. Further, since the deviation signal ΔREC decreases as the output signal from the pressure regulator 22 is increased, the rapid response of the electric generator reflected as the increased output power thereof in the initial phase will affect negatively the increase in the power of the nuclear reactor, whereby the delay involved for the reactor power to reach the desired or target value becomes greater as compared with the case in which no change or alternation is made to the set pressure point (refer to FIG. 3A).

As will be appreciated from the foregoing description, the hitherto known load control system is in summary disadvantageous in that (1) a considerable delay is involved in the response of the output power of the electric generator to the change or alternation of the set load point in the initial phase when the set pressure point modifying circuit is not operated, and that (2) when the set pressure point modifying circuit is operated, the increase in the output power from the electric generator follows a stepped characteristic curve exhibiting initially a rapid or steep rise-up to a certain level and a considerable delay is involved in attaining the desired or target value.

It is contemplated with the present invention to provide a novel and improved load control system for a nuclear power plant which is operated on the basis of a coordinated control of the output power of the electric generator and the power of the nuclear reactor for the purpose of reducing the delay in response of the conventional load control system described above.

Now, the invention will be described in conjunction with an exemplary embodiment of the load control system for a nuclear reactor power plant according to the invention.

Figure 4:
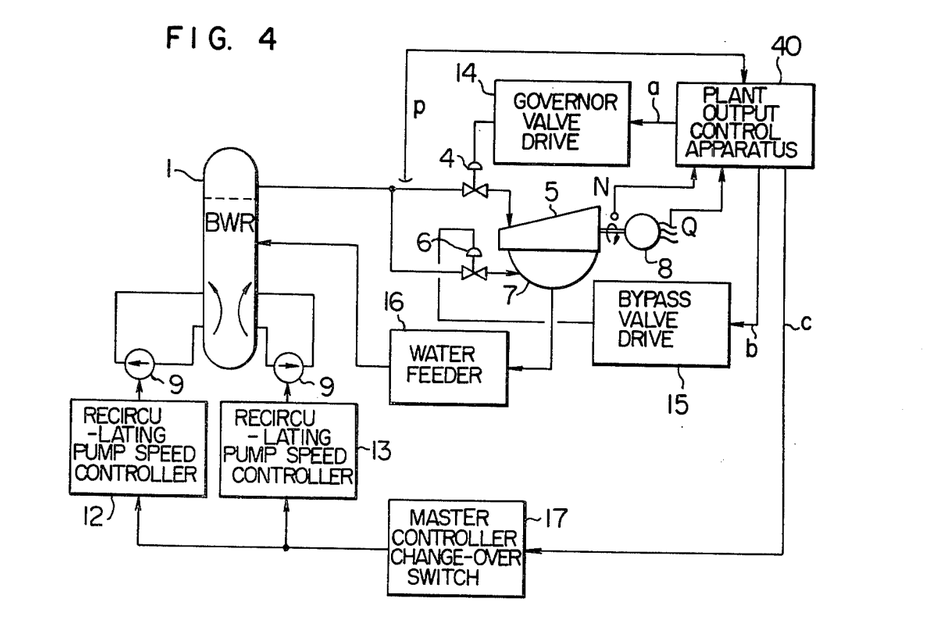
FIG. 4 shows in a block diagram a general arrangement of a BWR power plant to which the load control system according to an embodiment of the invention is applied.

FIG. 4 shows a general arrangement of a boiling water reactor power plant to which the control system according to an embodiment of the invention is applied. The control system according to the invention is incorporated in a plant output power control apparatus 40 which is supplied with a signal representative of the turbine inlet pressure p, a signal representative of the turbine speed N and a signal indicative of the output power Q of the electric generator which are arithmetically processed to produce the governor valve opening demand signal a, the bypass valve opening demand signal b and the recirculating pump speed demand signal c.

Figure 5:
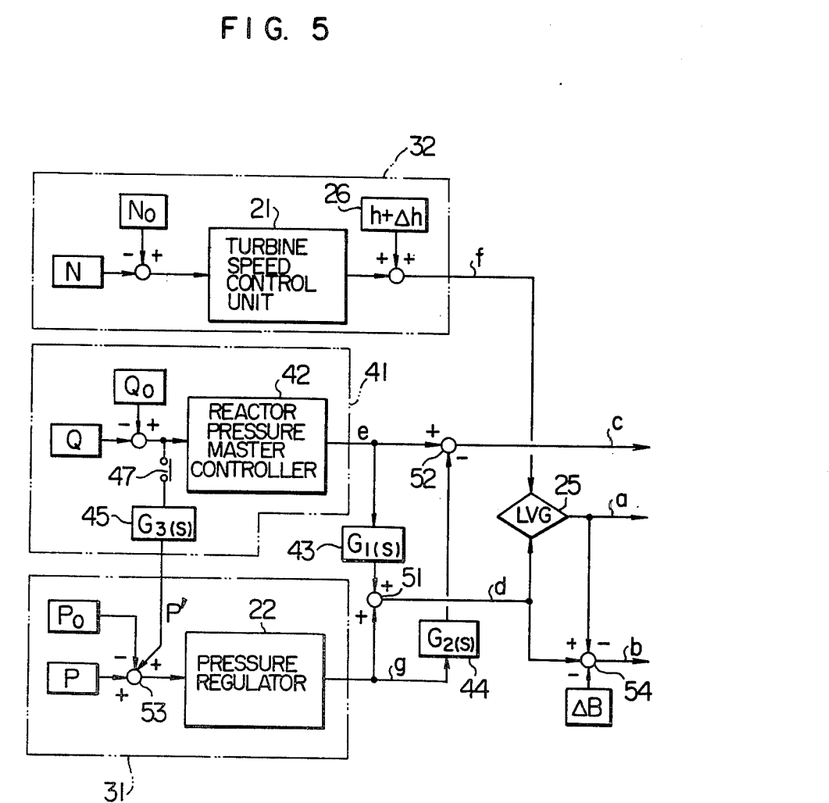
FIG. 5 shows in a block diagram an arrangement of a plant output control apparatus employed in the load control system shown in FIG. 4.

Referring to FIG. 5 which shows in a block diagram an exemplary embodiment of the plant output power control apparatus 40, it can be seen that the control apparatus 40 includes as major components a reactor pressure controller 31, a turbine speed controller 32 and a generator output power controller 41 together with connections among these controllers. The generator output power controller 41 for controlling the output power of the electric generator 8 coupled to the turbine output 5 is not used in the conventional turbine control apparatus 10 (FIG. 1) and provided according to the teaching of the invention. The generator output power control unit 41 includes a reactor power master controller 42 which is adapted to derive a signal representative of difference between the actual output power Q from the electric generator and a set value $Q_O$ therefor, the difference signal being subjected to a proportional plus integral operation to derive a signal e.

In the case of the control system now being described, the recirculation pump speed demand signal c and the total steam flow demand signal d are derived by combining an output signal g from a reactor output controller and the output signal e from the generator output controller by means of gain elements in accordance with the following expressions:

$$c+e-G_2(s)\cdot g \qquad (1)$$

$$d+G_1(s)\cdot e=g \qquad (2)$$

The total steam flow demand signal d is equal to the governor valve opening demand signal a in the normal operation. However, when the turbine speed is rapidly increased, the magnitude of the output signal f from the turbine speed controller is rapidly decreased, resulting in that the output signal f is selected by the low value gain selector 25. As the consequence, there makes appearance a deviation or difference between the total primary steam flow demand signal d and the governor valve opening demand signal a, the deviation or difference signal thus obtained being then made use of as the bypass valve opening demand signal b by way of a combining means 54.

The gain components $G_1(s)$ and $G_2(s)$ represent a total steam flow demand correcting gain (43) and a recirculation pump speed demand correcting gain (44), respectively. The following description will be made on the assumption that these gain components or transfer functions $G_1(s)$ and $G_2(s)$ are implemented by delay elements exhibiting a delay of first order or first order lag in accordance with following expressions:

$$G_1(s)+K_1/(1=T_1s) \qquad (3)$$

$$G_2(s)+K_2/(1=T_2s) \qquad (4)$$

wherein $K_1$ and $K_2$ represent gains, while $T_1$ and $T_2$ represent time constants of the first order lag elements.

Assuming now that the set value for the output power of the electric generator is stepwise increased, the master reactor power controller 42 performs a proportional plus integral operation on the inputted deviation signal, whereby the output signal e from the generator output controller 41 is increased. This signal e contributes directly to an increase in the recirculation pump speed demand signal c which is outputted by a combining or summing means 52, as the result of which the total steam flow demand signal d is increased only with a linear delay due to the effect of the total steam flow demand correcting gain 43. The increase in the total steam flow demand signal d will immediately bring about an increase in the steam flow to the turbine, eventually involving an increase in the output power Q of the electric generator. Since a time delay is involved in the process starting from the increase in the reactor power in response to the increase in magnitude of the recirculating pump speed demand signal c and leading to the increase in the reactor pressure, the reactor pressure P drops temporarily, to thereby cause the magnitude of the output signal g from the reactor pressure controller 31 to be decreased. However, so long as the output power Q from the electric generator is short of the set point or level, the output signal e from the generator output controller 41 continues to be increased, resulting in that the total steam flow demand signal d having passed through a combining or summing means 51 is prevented from being decreased. In time, the reactor power is increased as accompanied by restoration of the reactor pressure. Since the output signal g undergoes no variation in the steady state of the reactor pressure, the steady value of the reactor pressure is determined in accordance with the expressions (1) and (2) on the basis of the recirculation pump speed demand signal c and the total steam flow demand signal d which in turn are definitely determined in respect to the set output point $Q_O$ of the electric generator. Accordingly, by selecting appropriately the gains $K_1$ and $K_2$ in the steady state of the gain elements $G_1(s)$ and $G_2(s)$ which appear in the expressions (3) and (4) stated hereinbefore, the steady level of the reactor pressure can be made equal to the original value $Q_O$ even when the set point for the output power of the electric motor is varied.

Further, the control system according to the invention enjoys advantageous features described below. It should first be recalled that in the case of the conventional control system described hereinbefore, the increasing rate of the reactor power undergoes degradation for improving the initial response through the modification or change of the pressure setting point. In contrast, in the case of the control system according to the invention, the turbine governor valve 4 is forcibly opened in the initial phase, whereby the reactor pressure P is lowered and at the same time the magnitude of the output signal g from the reactor pressure controller 31 is also decreased at the beginning, resulting in that the increase of the recirculating pump speed is effectively accelerated under the action of the recirculating pump speed demand correcting gain. In this manner, the rate at which the reactor output is increased is very high as compared with the hitherto known control system in which modification or alteration of the set pressure point is not adopted.

Figure 6A:
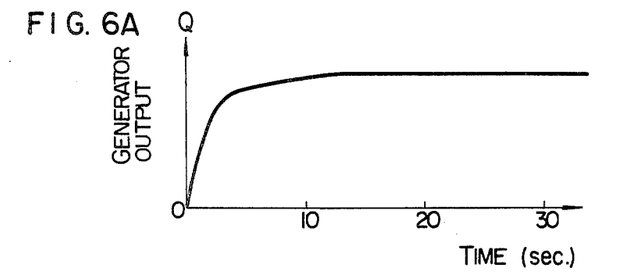
FIGS. 6A and 6B graphically illustrate computer-simulated response characteristic of the load control system shown in FIG. 4 upon changing of a set output power level of the electric generator.
Figure 6B:
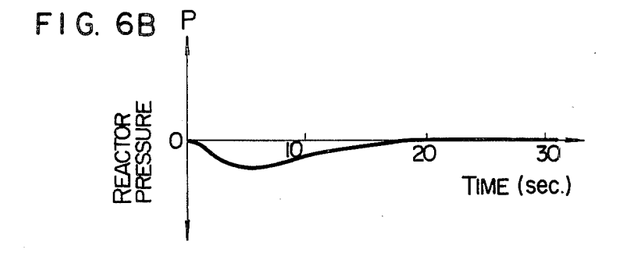

FIGS. 6A and 6B graphically illustrate variations in the output power Q of the electric generator and the reactor pump P in the power plant to which the aforementioned control system according to the invention is applied. The illustrated results are obtained through simulation executed with the aid of an electronic computer. In response to step-like increases or increments in the set point $Q_O$ for the output power of the electric generator, the actual output power Q of the electric generator is increased with an improved rise-up characteristic without being accompanied by the stall in the initial phase which makes appearance in the case of the prior art control system as described hereinbefore in conjunction with FIG. 3A. Although the reactor pressure drops temporarily in the initial phase due to increasing in the steam flow, restoration of the reactor pressure will soon take place as the recirculation pump speed demand signal rises up thereby to cause the reactor power to be increased. Although the description has been made on the assumption that the steady state gains $K_1$ and $K_2$ of the gain elements are so selected and set that the steady value or level of the reactor pressure be equal to the steady value which has prevailed before the external disturbance, it is readily possible to set the gains $K_1$ and $K_2$ so that the regulation rate of an appropriate value is involved.

Next, responding operation will be described on the assumption that the gain elements are set in accordance with the following expressions:

$$G_1(s) = K_1 s/(1+T_1 s) \tag{5}$$

$$G_2(s) = K_2 s/(1+T_2 s) \tag{6}$$

Figure 7A:
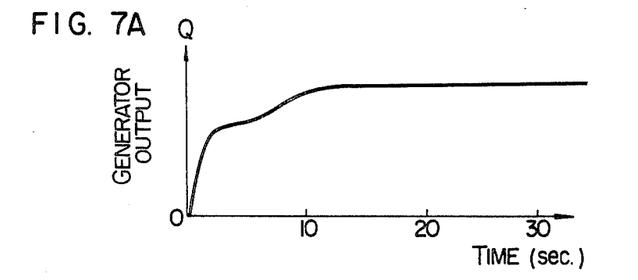
FIGS. 7A and 7B graphically illustrate other computer-simulated response characteristics of the load control system upon changing of the set output power level of the electric generator.
Figure 7B:
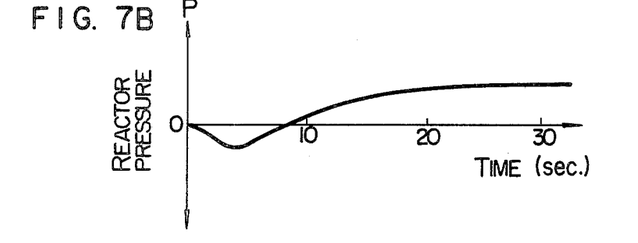

In this case, the individual gain elements are imparted with an incomplete differential characteristic. Accordingly, it can be said that the combination or coupling between the reactor pressure controller 31 and the generator output controller 41 is, so to say, weakened. FIGS. 7A and 7B graphically illustrate the results of operations simulated by an electronic computer. A step-like increase (increment) in the set point $Q_O$ for the output power of the electric generator brings about immediately an increase in the level of the output signal e from the generator output controller 41. However, since the governor valve opening demand signal a contains a signal component proportional to the increasing rate of the output signal e by virtue of the presence of the total steam flow demand correcting gain 43, the output power Q of the electric generator will rapidly rise up. As the output power Q of the electric generator approaches to the set value $Q_O$, the increasing rate of the output signal e from the generator output controller 41 becomes lowered on one hand, while magnitude of the output signal g from the reactor pressure controller is decreased on the other hand. Under the conditions, the increase rate in magnitude of the total steam flow demand signal d becomes stalled for a time being. However, the time required for the output power Q to reach the set point $Q_O$ is reduced to ½ or less as compared with the conventional control system (refer to FIG. 3A). Although the reactor pressure P is temporarily decreased in the initial phase in response to the rapid increase in the steam flow, ratio of contribution of the output signal e from the generator output controller 41 to the total steam flow demand signal d is reduced as the generator output power Q approaches to the set point therefor, due to the fact that the total steam flow demand correcting gain 43 is imparted with the incomplete differential characteristic, resulting in that the output signal g from the reactor pressure controller 31 occupies a predominant portion of the total steam flow demand signal d. In this manner, the reactor pressure P is increased as the reactor pressure rises up until the steady value determined by a pressure regulator 22 on the basis of the pressure regulation rate has been attained.

In the case of the simulated operation described above, there is not employed the circuit for effecting modification or alteration of the set pressure point in dependence on the deviation or difference signal between the actual generator output Q and the set point $Q_O$. When the set pressure point modifying circuit is made operative by closing the associated switch 47 (FIG. 5), following operations or processes take place. When the set point $Q_O$ for the output power of the electric generator is stepped up, the reactor pressure P will initially drop temporarily. However, since the output value P' from the set pressure point correcting gain $G_3(s)$ is increased, the set pressure value $|P'-P_O|$ resulting from the combination by the combining or summing means 53 will be concurrently reduced. Consequently, the output signal g from the reactor pressure controller prepared on the basis of the combined pressure difference signal $P-P_O+P_1$ scarcely undergoes reduction. This means that the actual output power Q of the electric generator can be increased rapidly to the target value without being suppressed by the increased total steam flow demand signal d and hence the increased governor valve opening demand signal a. At this time, the responding variation in the reactor pressure P is initially delayed temporarily. However, at a time point at which the deviation signal between the generator output signal Q and the signal representative of the set point $Q_O$ of the generator output becomes sufficiently small to step up again the set pressure point, the reactor power P is increased to allow the signal Q to attain rapidly the steady value $Q_O$. Although the set pressure point correcting gain 45 is usually imparted with a delay of first order, it goes without saying that the steady state gain and the time constant of the gain element 45 are selected to be optimal values for the whole control system in conjunction with the set values for the other gain elements $G_1(s)$ and $G_2(s)$.

Although the foregoing descriptions have been made with reference to two different examples of setting the total steam flow correcting gain 43 and the recirculation pump speed demand correcting gain 44, it will readily occur to those skilled in the art without departing from the scope of the invention that these gains may be combined in a rather arbitrary manner or gain elements imparted with a delay characteristic of higher order or non-linear characteristic to attain the desired response characteristic of the load control system through appropriate gain regulation.

As will now be appreciated, the present invention has provided a control system for a nuclear power plant which makes it possible to directly or straightforwardly control with an enhanced responding rate the output power of the electric generator by virtue of such arrangement that the output signal from the generator output controller is directly reflected onto the governor valve opening demand signal. Further, since the output signal from the reactor pressure controller is contained in the governor valve opening demand signal and at the same time reflected onto the reactor power change demand signal as in the case of the hitherto known plant control system, a high stability and reliability can be assured for the reactor pressure control.

We claim:

1. A load control system for a nuclear power plant, comprising:
   a generator output controller for generating a first control signal in accordance with a power difference signal representative of difference between an actually measured value of the output power of an electric generator and a set value of said generator output;
   a reactor pressure controller for generating a second control signal in accordance with a pressure difference signal representative of difference between an actually measured value of pressure of a nuclear reactor and a set value of said reactor pressure;
   first combining means for combining said first and said second control signals to thereby generate a recirculation pump speed demand signal for controlling a recirculating pump; and
   second combining means for combining said first and said second control signals to generate a total steam flow demand signal which determines a total steam flow passing through a governor valve and a bypass valve of a turbine.

2. A load control system for a nuclear power plant as set forth in claim 1, further comprising:
   a turbine speed controller for generating a third control signal in accordance with a signal representative of difference between an actually measured value of a rotation speed of the turbine and a set value of said rotation speed, and
   a low value gain element for producing a governor valve opening demand signal which corresponds to a smaller one of said total steam flow demand signal and said third control signal;
   wherein said turbine governor valve is driven by said governor valve opening demand signal for controlling the steam flow to said turbine.

3. A load control system for a nuclear power plant as set forth in claim 1, further comprising:
   third combining means for combining together said power difference signal obtained by means of said generator output controller and said pressure difference signal obtained by means of said reactor pressure controller to thereby produce a combined pressure difference signal;
   wherein said second control signal is produced on the basis of said combined pressure difference signal.

4. A load control system for a nuclear power plant as set forth in claim 3, further comprising:
   a set pressure point changing-over circuit switch for supplying selectively said power difference signal to said third combining means for producing said combined pressure difference signal, when occasion requires.

5. A load control system for a nuclear power plant as set forth in claim 1, further comprising:
   fourth combining means for producing a bypass valve opening demand signal in dependence on difference between said governor valve opening demand signal and said total steam flow demand signal, wherein said bypass valve opening demand signal is utilized for controlling the opening of said bypass valve for introducing a part of steam flow from said nuclear reactor to a condenser across said turbine.

6. A load control system for a nuclear power plant as set forth in claim 1, further comprising:
   a total steam flow demand correcting gain element for regulating said first control signal to be applied to said first combining means.

7. A load control system for a nuclear power plant as set forth in claim 1, further comprising:
   a recirculating pump speed demand correcting gain element for regulating said second control signal to be applied to said second combining means.

8. A load control system for a nuclear power plant as set forth in claim 6, wherein said total steam flow demand signal represented by d, said first control signal represented by e, said second control signal represented by g and a gain of said total steam flow demand correcting gain element represented by $G_1(s)$ are of a relationship given by the following expression:

$$d = G_1(s) \cdot e + g.$$

9. A load control system for a nuclear power plant as set forth in claim 7, wherein said recirculating pump speed demand signal represented by c, said first control signal represented by e, and a gain of said recirculating pump speed demand correcting gain element represented by $G_2(s)$ are of a relationship given by the following expression:

$$c = e - G_2(s) \cdot g$$

10. A load control system for a nuclear power plant as set forth in claim 6, wherein said total steam flow demand correcting gain element is imparted with either a delay characteristic of first order or an incomplete differential characteristic.

11. A load control system for a nuclear power plant as set forth in claim 7, wherein said recirculating pump speed demand correcting gain element is imparted with either a delay characteristic of first order or alternatively an incomplete differential characteristic.

12. A load control system for a nuclear power plant, comprising:

a generator output power controller for producing a first control signal in accordance with a power difference signal representative of difference between an actually measured value of the output power of an electric generator driven by a turbine and a set value for said output power;

a reactor pressure controller for producing a second control signal in accordance with a pressure difference signal representative of difference between an actually measured value of pressure of said nuclear reactor and a set value for said reactor pressure;

first combining means for combining said first and said second control signals to thereby produce a recirculating pump speed demand signal for controlling a recirculating pump;

second combining means for combining said first and second control signals to thereby produce a total steam flow demand signal for determining a total steam flow flowing through a turbine governor valve and a bypass valve;

a turbine speed controller for generating a third control signal in accordance with a signal representative of difference between an actually measured value of a rotation speed of the turbine and a set value of said rotation speed, and a low value gain element producing a governor valve opening demand signal which corresponds to a smaller one of said total steam flow demand signal and said third control signal;

wherein said turbine governor valve is driven by said governor valve opening demand signal for controlling the steam flow to said turbine.

13. A load control system for a nuclear power plant as set forth in claim 12, further comprising:

third combining means for combining together said power difference signal obtained by means of said generator output controller and said pressure difference signal obtained by means of said reactor pressure controller to thereby produce a combined pressure difference signal;

wherein said second control signal is produced on the basis of said combined pressure difference signal.

14. A load control system for a nuclear power plant as set forth in claim 12, further comprising:

fourth combining means for producing a bypass valve opening demand signal in dependence on difference between said governor valve opening demand signal and said total steam flow demand signal, wherein said bypass valve opening demand signal is utilized for controlling the opening of said bypass valve for introducing a part of steam flow from said nuclear reactor to a condenser across said turbine.

* * * * *